United States Patent
Oh et al.

(10) Patent No.: US 7,715,466 B1
(45) Date of Patent: May 11, 2010

(54) INTERFERENCE CANCELLATION SYSTEM AND METHOD FOR WIRELESS ANTENNA CONFIGURATION

(75) Inventors: Dae-Sik Oh, Overland Park, KS (US); Mark Yarkosky, Overland Park, KS (US); Kristin A. Hayne, Overland Park, KS (US); Thomas M. Steele, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 842 days.

(21) Appl. No.: 11/035,140

(22) Filed: Jan. 13, 2005

Related U.S. Application Data (63) Continuation-in-part of application No. 10/083,933, filed on Feb. 27, 2002, now Pat. No. 7,162,261.

(51) Int. Cl.
*H04B 7/14* (2006.01)
(52) U.S. Cl. .................... 375/211; 455/7; 375/140
(58) Field of Classification Search .......... 375/259, 375/260, 264, 265, 295, 296, 316, 211; 455/3.01, 455/3.03, 456.1, 456.5, 456.6, 7, 15–16; 370/310, 315, 320, 321, 332, 334
See application file for complete search history.

(56) References Cited

U.S. PATENT DOCUMENTS

| | | | | |
|---|---|---|---|---|
| 3,819,872 A | * | 6/1974 | Hamrick | 455/438 |
| 4,112,257 A | * | 9/1978 | Frost | 455/437 |
| 5,280,472 A | * | 1/1994 | Gilhousen et al. | 370/335 |
| 5,697,052 A | * | 12/1997 | Treatch | 455/20 |
| 5,983,072 A | * | 11/1999 | Schroderus | 455/11.1 |
| 6,377,612 B1 | * | 4/2002 | Baker | 375/141 |
| 6,459,909 B1 | * | 10/2002 | Bilcliff et al. | 455/562.1 |
| 6,510,145 B1 | * | 1/2003 | Kim et al. | 370/329 |
| 6,650,629 B1 | * | 11/2003 | Takahashi et al. | 370/335 |
| 6,952,181 B2 | * | 10/2005 | Karr et al. | 342/457 |
| 2002/0154705 A1 | * | 10/2002 | Walton et al. | 375/267 |
| 2003/0050085 A1 | * | 3/2003 | Peluso et al. | 455/522 |
| 2003/0123401 A1 | * | 7/2003 | Dean | 370/318 |
| 2003/0153316 A1 | * | 8/2003 | Noll et al. | 455/446 |
| 2003/0195017 A1 | * | 10/2003 | Chen et al. | 455/562.1 |
| 2003/0220075 A1 | * | 11/2003 | Baker et al. | 455/17 |
| 2004/0131025 A1 | * | 7/2004 | Dohler et al. | 370/328 |

* cited by examiner

*Primary Examiner*—Shuwang Liu
*Assistant Examiner*—David Huang (57) ABSTRACT

Presently disclosed is a method for reducing interference in a wireless distributed antenna systems. In an embodiment, interference is reduced by selectively placing a first wireless remote unit in a reduced signal interference mode. A controller sends a signal, such as a reverse link power-down signal, to the first remote unit after detecting less than a threshold incoming signal strength at the first remote unit. In an alternative embodiment, the controller requests that a given remote unit switch to the reduced signal interference mode when the controller is receiving signals from a mobile station through at least two different remote units.

13 Claims, 6 Drawing Sheets

INTERFERENCE CANCELLATION SYSTEM AND METHOD FOR WIRELESS ANTENNA CONFIGURATION

RELATED U.S. APPLICATION DATA

This application is a continuation-in-part of application Ser. No. 10/083,933 filed Feb. 27, 2002. Application Ser. No. 10/083,933 is hereby incorporated by reference.

FIELD OF THE INVENTION

The present invention relates to network communications and, more particularly, to wireless distributed antenna systems.

BACKGROUND

Wireless communication is an increasingly popular means of personal communication in the modern world. People are using wireless networks for the exchange of voice and data as an alternative to using a wire infrastructure. In principle, a user can seek information over the Internet or call anyone over the public switched telephone network (PSTN) from any place inside the coverage area of the wireless network.

In a typical cellular wireless system, an area is divided geographically into a number of cell sites, each defined by a radiofrequency (RF) radiation pattern from a respective base transceiver station (BTS) antenna. The BTS antenna in the cells are in turn coupled to a base station controller (BSC), which is coupled to a telecommunications switch (e.g., mobile switching center (MSC)) or gateway (e.g., packet data serving node (PSDN)) that provides connectivity with a transport network such as the PSTN or the Internet.

When a mobile station (MS) (such as a cellular telephone, pager, or appropriately equipped computer, for instance) is positioned in a cell, the MS and BTS can communicate with each other in various channels over an RF air interface. Communications from the BTS to an MS are considered to be in a "forward" direction, so the air interface channels used to carry such communications are referred to as the "forward link" channels. Conversely, communications from an MS to the BTS are considered to be in a "reverse" direction, so the air interface channels used to carry such communications are referred to as "reverse link" channels.

Traditionally, in-building communication, such as within a home or office building has been conducted via landline communication technology. Now, wireless communication is increasingly being used within buildings, replacing the more traditional landline communication facilities. Use of a MS instead of a fixed landline terminal can conveniently allow for free movement within buildings as well as into and out of the buildings. Traditional wire infrastructure private branch exchange (PBX) may be replaced, for example, by a wireless PBX to route phone calls and Internet connections inside a building.

A wireless communications technique commonly used to allow multiple users on the same channel is code division multiple access (CDMA). CDMA permits multiple users to use the same wireless communication channel at the same time, which allows the network infrastructure to support more wireless users. In CDMA, a narrowband data signal from a MS is spread over a spectrum of frequencies in order to create a broadband signal for transmission to a BTS. When the BTS receives the broadband signal, it uses a unique code to recover the transmitted narrowband data signal from the multiple of signals encountered by the BTS.

Distributed antenna systems (DAS) have been developed in order to provide better in-building coverage. In a DAS, a number of antenna units are distributed throughout a geographic area and controlled by a DAS controller. Antenna units are configured to communicate with mobile stations located within their respective coverage areas. In wireless DAS (WDAS), remote antenna units are communicatively coupled with a WDAS controller (or hub) via wireless links. U.S. patent application Ser. No. 10/222,015, filed by Mark L. Yarkosky entitled "Method and system for decreasing noise from wireless repeaters" provides further background and is hereby incorporated by reference.

SUMMARY

Radiofrequency (RF) interference can be a problem for in-building wireless communication. An in-building WDAS is particularly susceptible to interference in at least two locations. First, interference may be created by wireless communications between WDAS remote units and mobile stations (MS). Second, interference may be created by wireless communications between WDAS remote units and a WDAS controller. Interference in communications between a WDAS remote unit and an MS is known as "front-end interference." Likewise, interference occurring on communications between a WDAS remote unit and a WDAS controller is termed back-end interference. Either type of interference can result in loss of connection, echoing, signal degradation, and data transmission errors, for instance.

One source of the interference is overlapping RF signals generated by the wireless communications. When the WDAS is configured within a building, interference problems can be even more acute, as the structure of the building can further cause reflections and signal interference. Such interference could be a problem for cellular wireless carriers who are seeking to promote in-building use of their services. The various disclosed embodiments have been designed in consideration of these and other problems.

A WDAS is organized with a WDAS controller or main hub that wirelessly communicates with a number of remote units. In turn, these remote units communicate with wireless devices such as mobile stations. Although not necessary, network intermediaries, such as routers, hubs, repeaters and the like, may be interspersed in the communication pathway connecting the controller with a mobile station. The WDAS may also be connected with an external network such as the PSTN and/or a wireless communications network to facilitate communication with entities outside the WDAS. At the WDAS, communications along the pathway from the WDAS controller to an MS are considered to be in a forward direction, so the air interface channels used to carry such communications are referred to as "forward link" channels. Similarly, communications from an MS to the WDAS controller are considered to be in a reverse direction, so the air interface channels used to carry such communications are referred to as "reverse link" channels.

An exemplary embodiment of the present invention operates to reduce signal interference in a WDAS. According to the embodiment, wireless communication functionality of a selected WDAS remote unit is disabled and/or switched off in order to avoid interference with communications passing through other WDAS remote units. By way of example, the WDAS may reduce back-end interference by turning off back-end reverse-link transmissions from the selected WDAS remote unit. The WDAS may also reduce interference by causing the character of transmissions from the selected WDAS remote unite to be modified. Such modification can take the form of shutting off a particular transmission channel or reducing signal strength, for instance.

More generally, in order to reduce signal interference, the selected WDAS remote unit switches to a reduced signal interference mode. In an exemplary embodiment, the selected WDAS remote unit switching to the reduced signal interference mode by shutting off transmissions from of the selected WDAS remote unit—thus, reducing the potential for signal interference.

While in the reduced signal interference mode, a WDAS remote unit may be inoperative as a communication portal. Thus, in order to limit disruption in network availability, it may be preferable to select a WDAS remote unit that is either minimally active or acting in a duplicative manner.

For the case of a minimally active WDAS remote unit, if the WDAS controller detects that a given remote unit is receiving less than a threshold level of input signal strength, then, in response, the WDAS controller may decide to switch the given remote unit to a reduced signal interference mode. More particularly, the WDAS controller may be configured to switch the given remote unit to the reduced signal interference mode after determining that there is no operating (or detectable) MS in the coverage area of the given remote unit.

For the case of a duplicative WDAS remote unit, the WDAS controller chooses a remote unit to be switched to the reduced signal interference mode based on a received indication that an MS is in communication with at least two WDAS remote units. In this case, the WDAS controller may choose the remote unit after receiving an indication that the MS is in communication with at least two WDAS remote units. Receiving the indication that the MS is in communication with at least two WDAS remote units may further comprise receiving reverse link communications from the at least two WDAS remote units. Alternatively, receiving the indication may include receiving origination signals for an MS communication link from the at least two WDAS remote units. The WDAS controller may additionally select a primary WDAS remote unit for continuing communication with the MS.

According to the exemplary embodiment, after selecting the remote unit, the controller instructs the selected remote unit to switch to a reduced signal interference mode. The WDAS controller may instruct the selected remote unit by transmitting a signal to the selected remote unit, for instance. The signal, in turn, triggers the selected remote unit to switch to the reduced signal interference mode.

These and other aspects and advantages will become apparent to those of ordinary skill in the art by reading the following detailed description, with reference where appropriate to the accompanying drawings. Further, it should be understood that the foregoing summary is merely exemplary and is not intended to limit the scope of the invention as claimed.

BRIEF DESCRIPTION OF THE DRAWINGS

Various embodiments of the present invention are described herein with reference to the drawings, in which.

DETAILED DESCRIPTION

1. Overview and System Architecture

Generally speaking, a wireless distributed antenna system (WDAS) can provide better and more convenient communication services in areas where buildings, tunnels, land masses, or other interference artifacts may block or alter RF signals. It is expected that a WDAS will be implemented inside of buildings to provide wireless service for mobile stations (MS) throughout the buildings. Because a WDAS can involve a multiplicity of radiofrequency broadcasters, signal interference is a common problem. The following examples disclose a method for avoiding the signal interference by selectively switching remote antennas of the WDAS to reduced interference modes.

Figure 1:
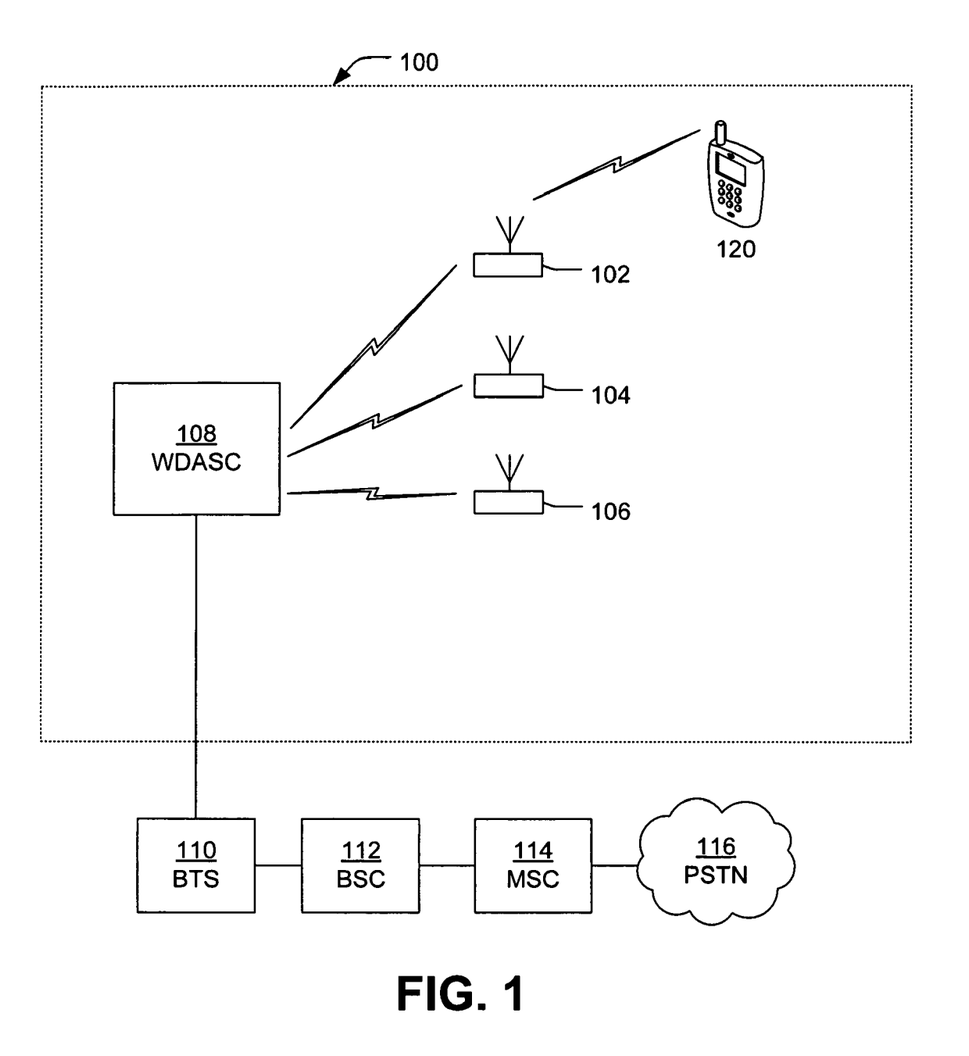
FIG. 1 is a generalized block diagram depicting an example wireless distributed antenna system (WDAS) infrastructure.

Referring to the drawings, FIG. 1 is a block diagram illustrating components of a WDAS 100 coupled to elements of a larger wireless network. Several WDAS remote units 102, 104, 106 are geographically distributed within the WDAS 100 such that each remote unit has a distinct coverage area. The coverage areas define radiofrequency (RF) response boundaries for the WDAS remote units 102, 104, 106. A MS 120 is shown in communication with one of the WDAS remote units 102 over an RF channel. A WDAS controller (WDASC) 108 is configured to communicate with each of the WDAS remote units 102, 104, 106 over an RF channel. More generally, the WDASC 108 may be a hub or repeater. Communication between a WDAS remote unit 102, 104, or 106 and the MS 120 is termed "front-end communication." Likewise, communication between a WDAS remote unit 102, 104, 106 and a WDASC 108 is termed "back-end communication."

Often the coverage area of one remote unit will overlap with coverage area of another remote unit. In the preferred embodiment, the WDAS is configured so that the front-end coverage areas do overlap in an attempt to ensure more geographically complete coverage. More overlap, however, provides more opportunity for signal interference.

Most commonly, WDAS remote units 102, 104, 106 include small, low power antennas that are distributed throughout a geographic coverage area such as a building and used to transmit the downlink signal from the WDASC 108 to the MS 120 and to receive the uplink signal transmitted from the MS 120 to the WDASC 108. In other embodiments, however, the WDAS remote units 102, 104, 106 include other types of antennas capable of communicating with the MS 120 and WDASC 108.

The WDASC 108 may control several aspects of the WDAS including power level of wireless signals emitted by the WDAS remote units 102, 104, 106 and handoff (if required) as a MS is moved between front-end local coverage areas within the WDAS 100. According to the presently described embodiment, the WDASC 108 is shown communicatively coupled with a base transceiver station (BTS) 110 of a public cellular wireless network (such as the Sprint PCS wireless network). The BTS 110 is communicatively coupled to a base station controller (BSC) 112. The BSC 112 can function to control communications via one or more BTS. For instance, in some arrangements, a BSC 112 might control the power level of wireless signals emitted by a BTS 110 and might control the handoff of communications as a mobile station moves between sectors of a cellular wireless network.

The BSC 112 is then communicatively coupled to a telecommunications switch or gateway, such as a mobile switching center (MSC) 114 and/or a packet data serving node (PDSN), for instance. In this embodiment, the MSC 114 is coupled to one or more networks, such as the public switched telephone network (PSTN) 116, and can manage voice sessions established by the MS 120. Alternatively or additionally, the MSC 114 may be coupled to and may manage packet data sessions established by the MS 120. The MSC 114 may be further coupled to other networks known to those skilled in the art.

It should be understood that this and other arrangements described herein are set forth for purposes of example only. Other arrangements and elements can be used instead and some elements may be omitted altogether. For example, various hubs and routers may be interspersed in the forward and reverse link between a MS and a WDASC. Further, many of the elements described herein are functional entities that may be implemented as hardware, firmware or software, and as discrete components and/or in conjunction with other components, in any suitable combination and location.

2. Front-End Interference

Figure 2:
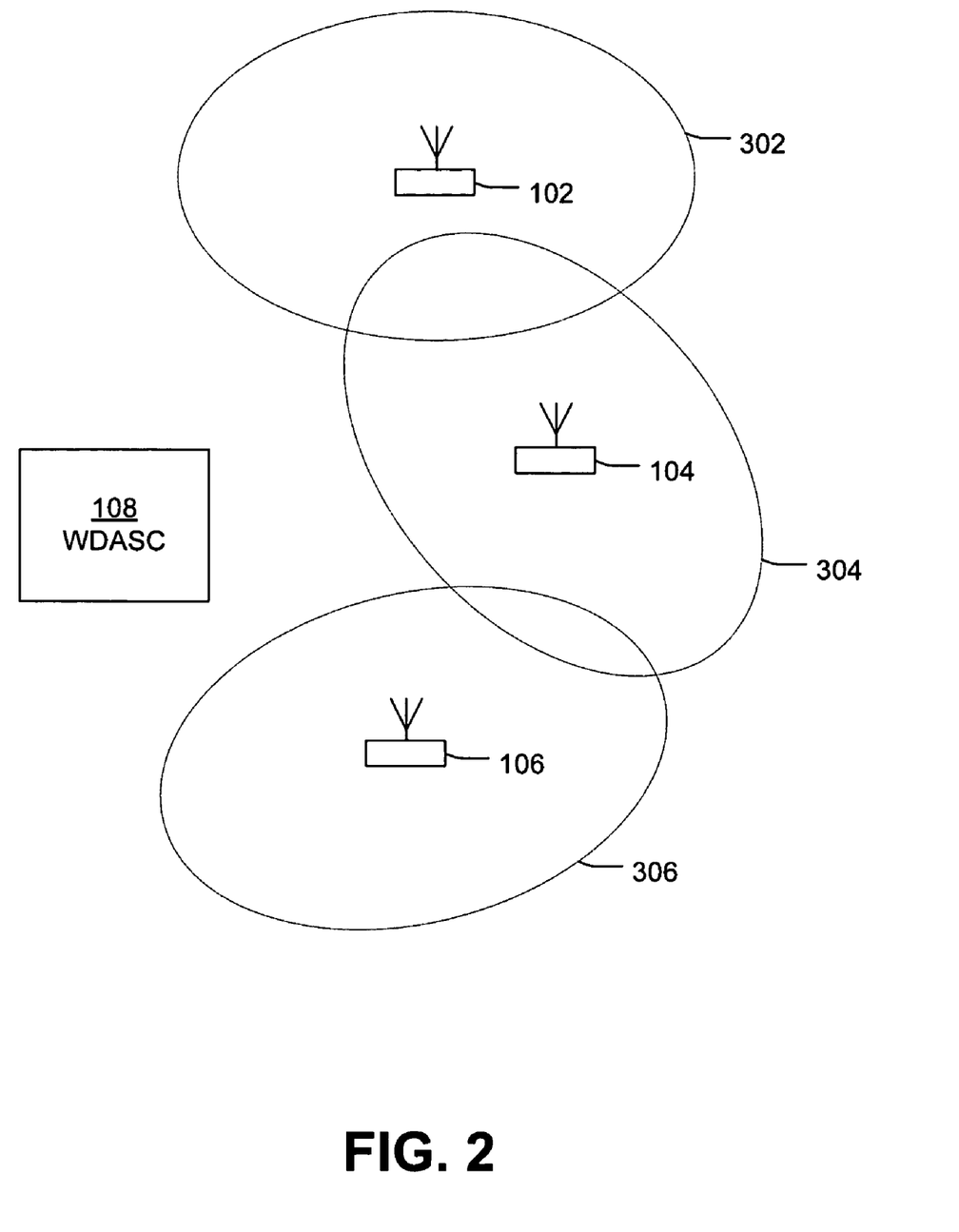
FIG. 2 is a generalized block diagram depicting an example WDAS showing front-end coverage areas.

Now turning to FIG. 2, which provides a block drawing illustrating an example WDAS and a sense of front-end coverage areas of the WDAS. A front-end designation indicates that the coverage area is configured for communication with an end-user device or customer equipment such as a MS, personal computer (PC) or VOIP station. In FIG. 2, three remote units 102, 104, 106 are geographically distributed within a locale. Front-end coverage areas 302, 304, 306 are shown for remote units 102, 104, 106, respectively. A WDASC 108 can communicate with each remote unit 102, 104, 106 through RF communication links, for instance.

Front-end coverage areas 302, 304, 306 represent example radiation patterns. The radiation patterns will vary according to the type and method of use of the associated antenna. For example, a bi-directional antenna may produce a radiation pattern that extends primarily along a single axis. The bi-directional antenna (also known as a dipole antenna) can be oriented in any direction according to floor plan requirements. By way of example, for a local coverage area that is intended to include areas on a floor of a building, the strong axis of a bi-directional antenna may be oriented to run parallel with the floor. On the other hand, a bi-directional antenna serving an elevator shaft, for instance, may be oriented so that the strong axis runs up and down the shaft in order to maximize coverage within the shaft.

Other types of antennas may also be used to provide coverage within the local wireless network. For example, a planar omni-directional antenna may be useful for providing more complete coverage for a floor of a square or round area. Because of the irregular and/or lobular shapes of the radiation patterns of many antennas, radiation patterns can overlap. In one embodiment, the radiation patterns of the antennas substantially overlap to ensure adequate system coverage. These overlapping front-end coverage areas 302, 304, 306 are shown in FIG. 2.

The overlapping front-end coverage areas make it likely that at any given point within a building equipped with a WDAS, a MS may be within radiation fields of multiple WDAS antennas. Additionally, although the radiation fields in FIG. 2 are shown as discrete patterns, the true nature of the coverage area may involve a gradual decline in signal strength from an antenna as the distance from the antenna increases. The coverage areas shown in FIG. 2 may represent threshold fields for a supporting a determined quality of communication.

Because coverage areas overlap, there is a potential for signal disturbances (interference) within the WDAS. This problem can take the form of dropped calls, static on the line, voice distortion, and other interference, for instance. According to an embodiment of the present invention, potential interference is reduced by switching off the front-end radiation pattern of one of the remote units (e.g., remote unit 104).

3. Back-End Interference

Figure 3:
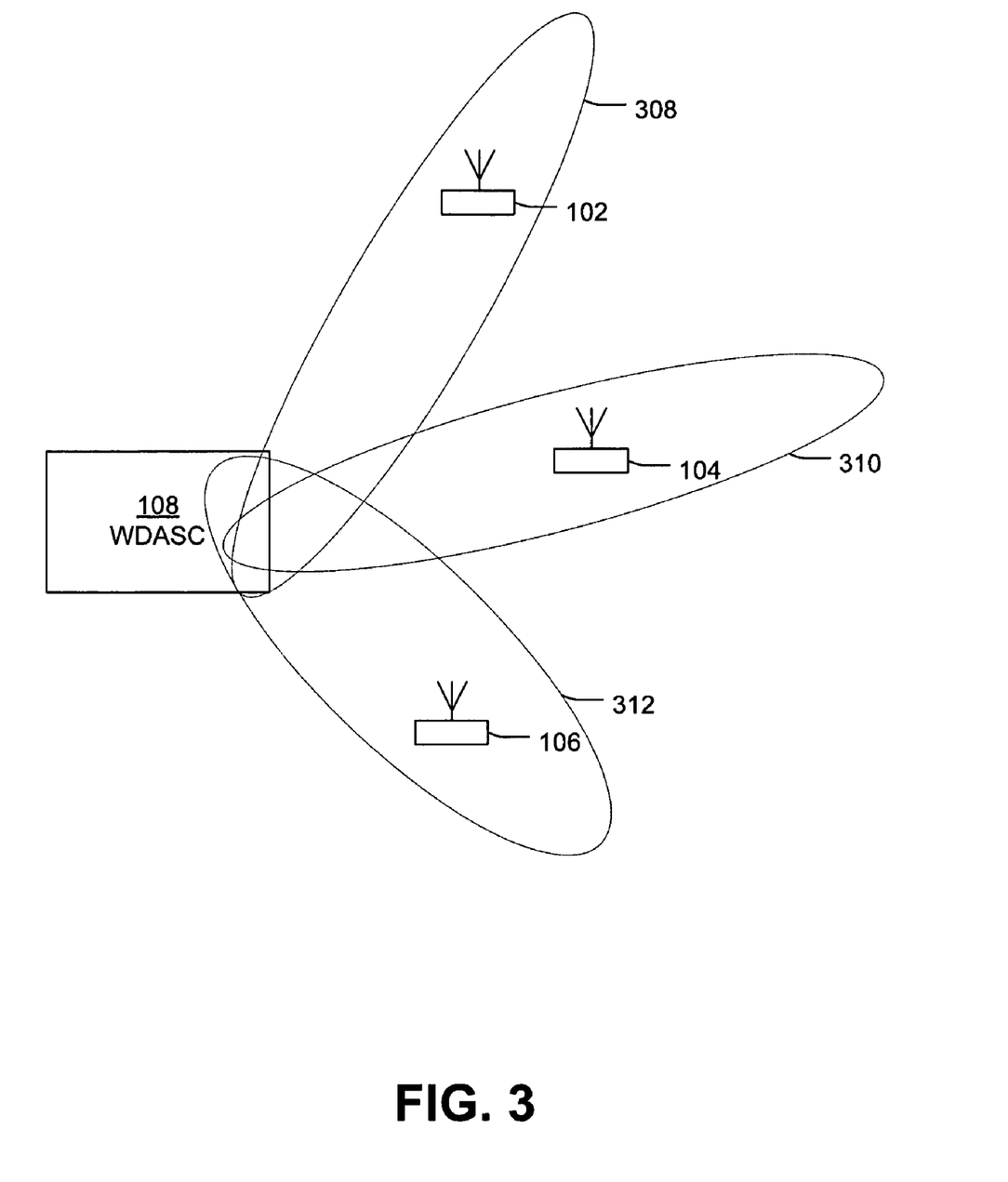
FIG. 3 is a generalized block diagram depicting an example WDAS showing back-end communication beam coverage areas.

FIG. 3 is a block drawing illustrating a WDAS showing example back-end communication pathways. In this application, the communication pathways are termed "back-end" when they do not communicate directly with an end-user apparatus such as a MS. Three remote units 102, 104, 106 are distributed geographically throughout a WDAS and are configured to provide wireless communications access to a MS within their front-end coverage areas. A WDASC 108 is located within wireless communication range of the remote units 102, 104, 106. Communication beams 308, 310, 312 represent communication beams between the WDASC 108 and the remote units 102, 104, 106, respectively. The communication beams, or beam columns 308, 310, 312, are RF signals transmitted along a narrow path. Ideally, the beams represent unidirectional flows of RF waves.

In the example, the WDASC 108 has several beam columns 308, 310, 312 that point to the various remote units 102, 104, 106. Each beam column has a dynamic gain range and a narrow beam width and is configured to support wireless communication with the remote units 102, 104, 106. For example, antennas in the WDASC 108 and/or remote units 102, 104, 106 may employ narrow beam antenna arrays that provide, for example, a 15 degree beam width to restrict RF level radiation and interference.

One purpose of having narrow beam columns for communications with various units is that these highly directional beams can focus on the particular remote units. Even with narrow beams, however, signal interference can occur between various beams. Accordingly, the WDASC 108 can turn off an element of communication with one of the remote units 102, 104, 106 in order to reduce interference. In other embodiments, various types of antennas may be used.

In some embodiments, the WDASC 108 has an intelligent methodology for calculating path loss to support minimum RF power levels to each corresponding remote hub. Alternatively, the path loss can be configured by users. In addition the WDASC 108 can detect the status of each traffic channel associated with the WDAS.

4. Example WDAS Remote Unit

Figure 4:
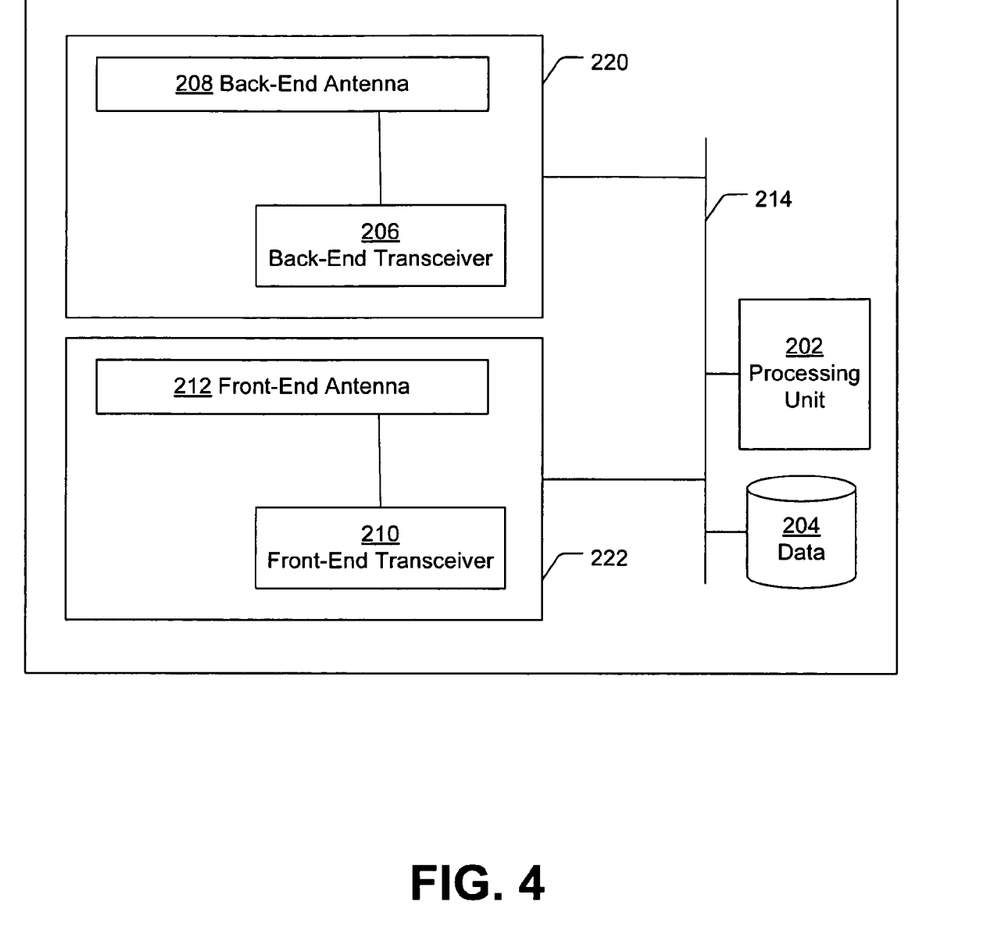
FIG. 4 is a generalized block diagram depicting an example WDAS remote unit.

FIG. 4 is a block diagram of a WDAS remote unit that may be used in several of the described embodiments. For example, the WDAS remote unit of FIG. 4 could be any of the remote units 102, 104, 106 in FIG. 1. As shown in FIG. 4, the WDAS remote unit includes a processing unit 202, data storage 204, a back-end communications interface 220 having a back-end transceiver 206 and a back-end antenna 208, and a front-end communications interface 222 having a front-end transceiver 210 and a front-end antenna 212, all of which may be coupled together by a system bus, network or other mechanism 214.

The processing unit 202 may comprise one or more general purpose processors (such as Intel brand processors, for instance) and/or one or more dedicated processors (e.g., DSP chips or ASICs) for carrying out the preferred functions. The data storage 204 may comprise volatile and/or non-volatile memory and/or other types of storage. The data storage 204 is configured to hold machine language instructions executable by the processing unit 202 to carry out various function described herein. Further, the data storage 204 may hold other data and information to be called upon during execution of the machine language instructions.

The back-end communications interface 220 preferably enables the WDAS remote unit to wirelessly communicate with a WDAS controller or hub. The back-end antenna 208 may, for example, be a directional antenna that provides a narrow wireless communication beam directed toward a WDAS controller antenna. More generally, the back-end antenna 208 may be any type of antenna. Likewise, the front-end communications interface 222 preferably enables wireless communication with a mobile station or other end-user element. The front-end antenna 212 may be a bi-directional or omni-directional antenna, for instance, that provides a RF coverage area suitable for cellular wireless communication. However, the front-end antenna 212 may be any type of antenna. Further, in one embodiment, the front-end antenna 212 and back-end antenna 208 are combined into a single antenna—thus requiring only a single antenna aboard the WDAS remote unit. In yet another embodiment, the front-end communications interface 222 and the back-end communications interface 220 are a single unit. According to certain embodiments, the antenna(s) may extend beyond a housing of the unit, if any. Suitable antennas may include flat planar patch antennas, omni-directional antennas, and/or dipole antennas. In a preferred embodiment, the back-end antenna 208 is distinct from the front-end antenna 212. Directional antennas, for example, provide high gain and may allow more control of signal coverage areas. Omni antennas are useful for larger or more open areas and can provide full 360 degree coverage patterns. Another factor to be considered is whether the antenna provides a low visual profile. In another embodiment, however, the back-end antenna 208 and front-end antenna 212 are the same antenna.

The remote unit may also include a build-out circuit such as a variable gain amplifier which can be set to amplify input signals received from the controller. As such, the build-out circuit may be configurable to provide a gain ranging from a minimum gain to a maximum gain.

The WDAS remote unit may include a user interface (not shown) to facilitate user interaction with the WDAS remote unit. The user interface may, for instance, take the form of a web server, so that an administrator of the wireless service provider can conveniently access the rules engine via the Internet. Through the interface, a user may load new logic onto the rules engine or modify the logic present on the rules engine. The user interface may require no additional hardware on the WDAS remote unit.

In back-end communications with a WDASC, each WDAS remote unit may distinguish itself through the use of a pseudo-random sequence (PN) configured to correspond to different communication channels. A WDASC is able to recognize that a signal is coming from a particular WDAS remote unit based on the PN of the decoded received signal. Likewise, the WDAS remote unit can be configured to recognize a particular WDASC based on its PN. Other mechanisms are also available to one skilled in the art for identifying functional elements interacting in the WDAS.

PN sequences may used within the Code Division Multiple Access (CDMA) wireless communications system that has been developed as one of several digital wireless transmission methods in which signals are encoded using a pseudo-random sequence. CDMA uses a spread spectrum that distributes (or spreads) a signal over a wide range of frequencies for transmission then de-spreads the signal back to the original data bandwidth at the receiving end. In an embodiment, a spread spectrum system can be thought of as providing wideband modulation that imparts noise-like characteristics to an RF signal for transmission. CDMA offers improvements over analog transmission in the areas of reduced call dropping, battery power conservation, more secure transmission and increased service options.

In CDMA spread spectrum, a WDAS remote unit can transmit a signal on the entire available bandwidth using the PN code that as a unique identifier for the remote unit. According to an embodiment, the PN code is a pseudo random sequence generated by a multistage shift register. Preferably, the PN code is generated such that the remote unit can be uniquely identified at a receiver by multiplying the received signal with a phase coherent copy of that PN code. Many spread spectrum techniques are available such as direct sequence spread spectrum, frequency-hopping spread spectrum, time-hopping spread spectrum, and hybrid techniques.

In a CDMA system a reverse link is defined as any link from a MS to a BTS. Often, two different types of signals or channels may be transmitted on the reverse link. These signal types are the Access Channels and the Traffic Channels. The access channel may be used to send signaling messages such as a call origination request, a page response, a registration request, an order message, etc. A system may have one or more access channels, each associated with a paging channel. The paging channel is used to send pages, which indicate incoming calls. The paging channel can also carry other information, such as indication(s) of voice mail, SMS indications, and/or housekeeping information including PN offsets of nearby cells and sectors. When a MS receives a page, a traffic channel request message is sent. After being granted a traffic channel, the MS may ring to inform a user that a phone call is waiting. The number of reverse-link traffic channels is generally determined by system self-interference. The total number of reverse-link channels supporting calls in progress equals the total number of forward-link traffic channels also supporting the same number of calls.

According to various embodiments, the presently described invention may be implemented to work with any digital or analog modulation scheme. For example, the system may be operational with any of TDMA, CDMA, GSM, 802.11 WLAN, or AMPS. Further, the WDASC or other device (not shown) may be configured to receive macro RF input and amplify the signal to remote units via an in-band or ISM band, for instance.

In another embodiment, a controller or BTS is configured to distribute a communication signal to remote units via wireless or wired (including fiber-optics) communications channels. Then, remote units radiate the signal to mobile stations in their local coverage areas.

5. Example Operations

Figure 5:
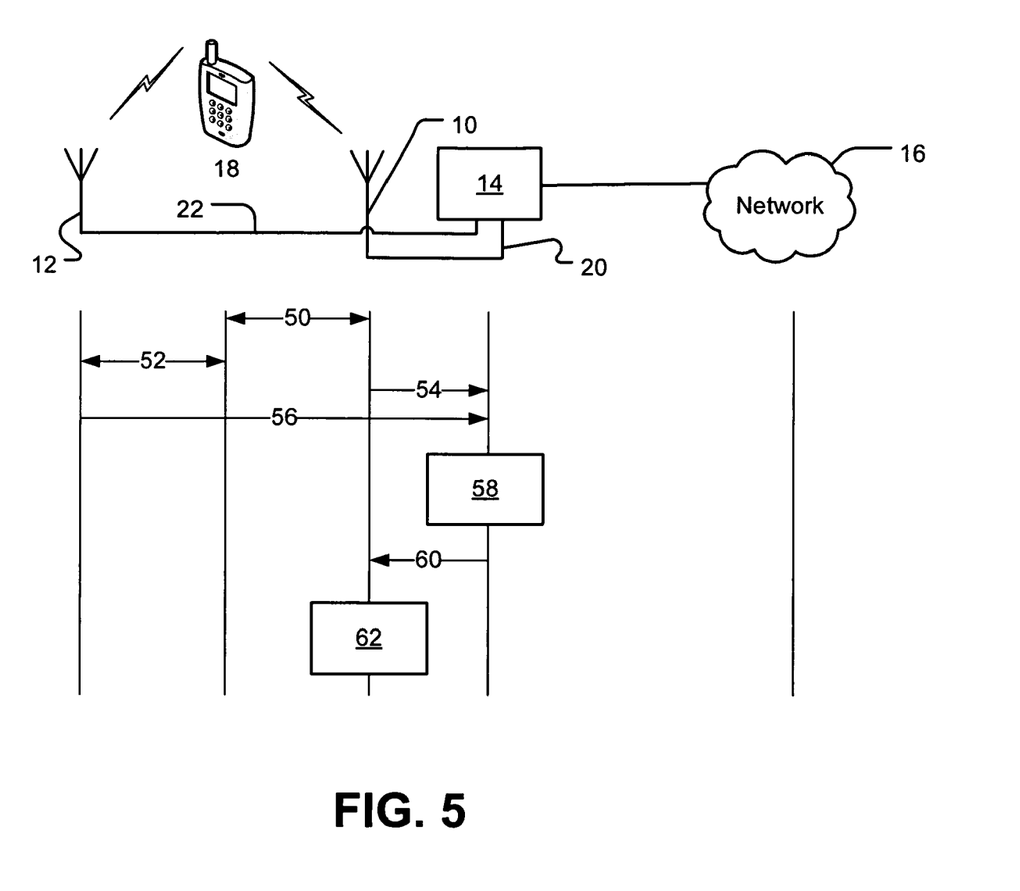
FIG. 5 is a flow chart depicting functions that can be carried out to reduce signal interference associated with an unused WDAS remote unit.

FIG. 5 is a message flow diagram for an example operation that reduces signal interference in a WDAS. A WDASC or controller 14 is shown coupled to a first remote unit 10. The coupling between the first remote unit 10 and the controller 14 is shown by first link 20. The first link 20 is preferably an over-air communications link such as that between a base station and a wireless device. In another embodiment, the link 20 is a physical coupling such as an optical connection or wire-line. The controller 14 is also coupled with a second remote unit 12. The coupling between the second remote unit 12 and the controller 14 is shown by second link 22. The second link 22 may be the same type as the first link or may be a different type of link. Thus, in an embodiment, the WDAS may operate over a combination of different types of signals. This may allow for various wireless signal types or a combination of wireless and landline signals. A MS 18 is shown within the coverage areas of each of the remote antennas 10, 12. The controller 14 is also shown coupled with a network such as a public CDMA network or a data network 16. The coupling between the controller 14 and the network 16 is shown by a third link 24 and may be any digital communications mechanism.

According to the signal sequence of FIG. 5, the MS 18 is within front-end local coverage areas of both the first remote unit 10 and the second remote unit 12. At step 50 a signal is communicated between the MS 18 and the first remote unit 10. The signal may take various forms. By way of example, the signal may be a call initiation signal from the MS 18 or may represent an open call channel. According to the preferred embodiment, after step 50, the first remote unit 10 has an indication that the MS 18 is within its front-end coverage area. Likewise, at step 52 a signal is communicated between the MS 18 and the second remote unit 12. The communications associated with steps 50 and 52 may, for example, be a single signal generated by the MS 18 and received by both remote units 10, 12.

At steps 54 and 56, the first and second remote units 10, 12 each send a signal to the controller 14. According to an example embodiment, the signals of steps 54 and 56 each indicate that the MS 18 is in communication with respective remote unit 10 or 12. Thus, after receiving the signals of steps 54 and 56, the remote hub 14 has received an indication that the MS 18 is in communication with at least two remote units 10 and 12 of the WDAS.

At step 58, the controller 14 processes the received signals and, in this embodiment, selects the first remote unit 10 as unnecessary and/or having a potential for RF interference. According to an embodiment, the controller 14 selects the first remote unit 10 as the given remote unit after determining that it is receiving the weakest signal from the MS 18. Alternatively, the controller 14 may select the first remote 10 as the given remote unit after determining that the first remote unit 10 is likely to cause interference. In a further embodiment, the controller 14 selects a primary remote unit for continuing communication with the MS 18.

In yet another embodiment, selecting the first remote unit 10 as the given remote unit involves compiling a combination of factors from both the received signals 54, 56 and data stored in the controller 14. Other criteria are available to those skilled in the art for selecting the given remote unit.

At step 60, the controller 14 transmits a signal to the first remote unit 10 to provide an indication to switch the first remote unit 10 to a reduced signal interference mode. As described, the signal may be a control message sent over the RF link between the controller 14 and the first remote unit 10.

At step 62, the first remote unit 10 switches to the reduced signal interference mode. The reduced signal interference mode is designed to reduce signal interference within the WDAS. According to one embodiment, switching to the reduced interference mode involves changing an RF communication channel of the first remote unit 10 to a reduced interference mode. That changing may involve turning off the communication channel all together. For example, changing the RF communication channel may include switching off the RF communication channel of the first remote unit 10. More specifically, the RF communication channel that is switched off may be either a front-end channel for communicating between the first remote unit 10 and the MS 18 or a back-end channel for communicating between the controller 14 and the first remote unit 10 (or both). Thus, in an embodiment, switching off the RF communication channel comprises cutting off wireless signal transmissions between the controller and the given remote unit. In an alternative embodiment, the switching to the reduced interference mode comprises turning off a radiofrequency (RF) link of the remote unit.

According to another embodiment, as a MS moves throughout a WDAS, the MS may move out of the coverage area of a preferred WDAS remote unit. When the MS moves out of the coverage area, a change of affiliation or handoff may occur. In this embodiment, a given remote unit may be switched from a reduced interference mode to a normal mode in order to accommodate the appearance of a new MS. Likewise, the preferred WDAS remote unit may be switched to the reduced interference mode. If the mobile station has a currently active connection, the network may provide a seamless transition to the remote unit, and maintain the connection.

Although in FIG. 5, the WDAS is shown having only a one-stop path from the controller 14 to the MS 18 by passing through one of the remote units 10, 12, that limitation is not necessary. It is expected that in some embodiments, additional routers, hubs, remote units, and/or antennas may be interspersed in the path. Thus, the path may include both wireless and optical or wireline connections.

Figure 6:
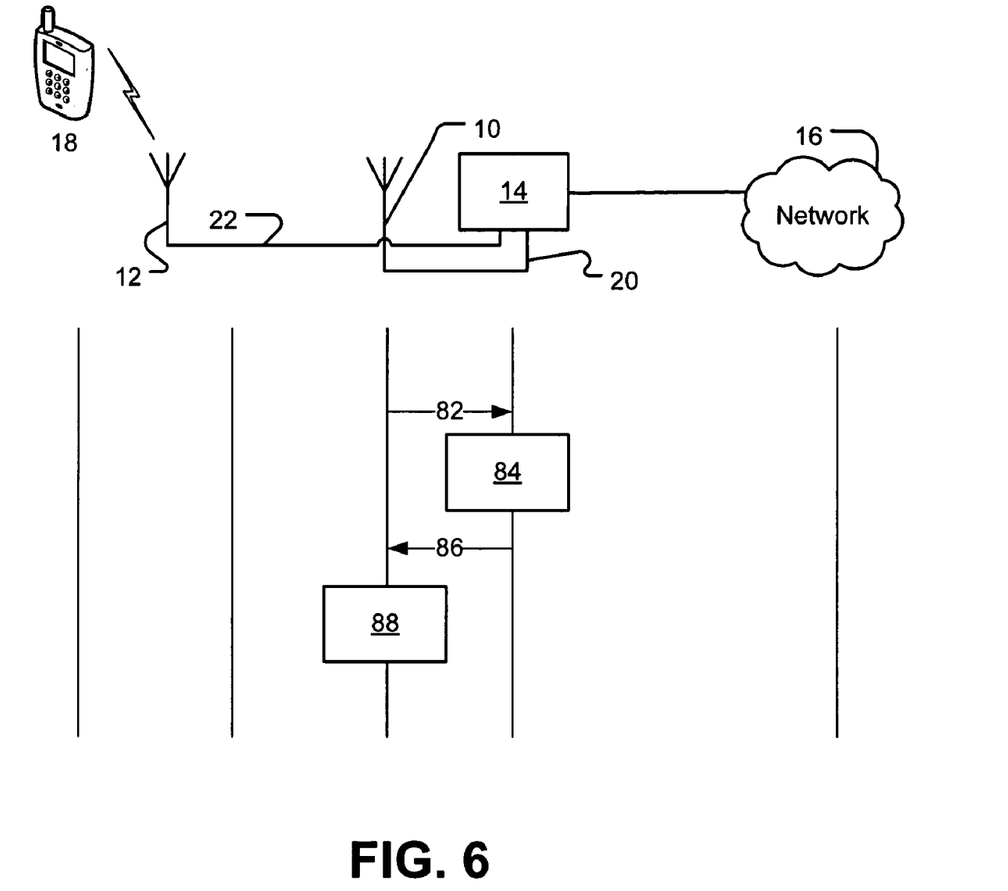
FIG. 6 is a flow chart depicting functions that can be carried out to reduce signal interference associated with a WDAS antenna that is receiving signals from a mobile station (MS).

FIG. 6 provides a process flow diagram for another embodiment. As in FIG. 5, a controller 14 is communicatively coupled with a first remote unit 10 and a second remote unit 12 through links 20 and 22 respectively. A communications network 16 is also coupled with the controller 14 and provides access to an external network. In this embodiment, a WDAS includes the controller 14 and the two remote units 10, 12. A mobile station 18 (MS) is shown communicating with the second remote unit 12. Accordingly, in this embodiment, the MS 18 is within the front-end coverage area of the second remote unit 12, but outside of the front-end coverage area of the first remote unit 10.

At step 82, the first remote unit 10 sends a signal to the controller 14 indicating that is receiving less than a threshold level of input signal strength. At step 84, the controller 14 detects that the first remote unit 10 is receiving less than a threshold level of input signal strength, and at step 86, in response, the controller 14 sends a signal to the first remote unit 10 that indicates that the first remote unit 10 should be switched to a reduced signal interference mode.

According to another embodiment, the controller 14 is configured to determine whether the first remote unit 10 is receiving at least a threshold signal without receiving any signal from the first remote unit 10. For example, if no communication channels are open between the controller 14 and the first remote unit 10, then the controller 14 may determine that the first remote unit 10 is not receiving at least a threshold signal. Thus, in this embodiment, step 82 of FIG. 6 may be eliminated. The threshold of input signal strength may, for instance, be set at some low level that is functionally a zero input signal level. Alternatively, the threshold level may vary according to the potential of the first remote unit 10 for creating interference. Thus, a remote unit that is likely to cause interference may be configured to be switched to the reduced interference mode at a higher threshold. Other factors may additionally be included in the switching decision. Data stored in either the remote unit, the controller, or both, may also be used in making the determination.

Once the controller switches a remote unit to a reduced signal interference mode, the controller may return the remote unit to a normal mode by sending a second signal to the remote unit. The remote unit may also return to the normal mode at the initiation of a self-triggered startup in the remote unit. Triggers may include receiving an origination signal from a MS or terminating a call at the WDAS, for instance. Thus, in an embodiment, after the MS has terminated a connection, the given remote unit may responsively switch back to a normal mode, where the normal mode includes switching-on the radiofrequency link of the remote unit.

4. Conclusion

A variety of embodiments have been described above. More generally, those skilled in the art will understand that changes and modifications may be made to these embodiments without departing from the true scope and spirit of the present invention, which is defined by the claims. For example, elements may be added or removed from the system architecture without eliminating usefulness of the embodiments. Further, equivalents of particular elements may be found in any combination of hardware, software, and firmware, for example.

We claim:

1. A method comprising:
providing a communication link between a mobile station and a controller in a wireless distributed antenna system (WDAS), wherein the WDAS is implemented inside a building and wherein the controller is a wireless distributed antenna system controller (WDASC);
receiving an indication at the controller that the mobile station is communicating through at least two remote units of the WDAS by receiving a radio-frequency message from each of the at least two remote units, wherein the mobile station is within the building;
selecting a first remote unit from the at least two remote units;
wirelessly transmitting a signal from the controller to the first remote unit, wherein the signal includes an indication to switch a radio-frequency (RF) reverse-link from the first remote unit to the controller to a reduced signal interference mode;
wherein selecting the first remote unit comprises:
comparing signal strengths received by the at least two remote units; and
based on the comparison, selecting the first remote unit, wherein the signal strength received by the first remote unit is less than the signal strength received by at least one of the remote units.

2. The method of claim 1, further comprising:
switching the first remote unit to the reduced signal interference mode.

3. The method of claim 1, wherein switching the RF reverse-link to a reduced signal interference mode comprises switching off the RF reverse-link.

4. The method of claim 1, further comprising:
selecting a second remote unit for continuing communication with the mobile station, wherein the second remote unit is different from the first remote unit.

5. The method of claim 1, wherein the WDASC is configured to communicate with a plurality of remote units over a CDMA radio-frequency (RF) network.

6. The method of claim 1, further comprising:
determining that no mobile station is operating in a coverage area of the first remote unit; and
responsively wirelessly transmitting a signal from the controller to the first remote unit indicating to switch the first remote unit to a reduced signal interference mode.

7. The method of claim 1, further comprising:
the first remote unit receiving an origination signal from a second mobile station; and
the first remote unit switching to a normal mode.

8. The method of claim 1, further comprising:
selecting a second remote unit for continuing communication with the mobile station, wherein the second remote unit is different from the first remote unit; and
after termination of a connection between the mobile station and the second remote unit, wirelessly transmitting a signal from the controller to the first remote unit indicating to switch the first remote unit to a normal mode.

9. In a wireless distributed antenna system (WDAS) implemented within a building having a WDAS controller (WDASC) and a plurality of WDAS remote units distributed throughout a geographic coverage area for providing a wireless communications platform for a mobile station (MS), a method of reducing signal interference comprising:
at the WDASC, detecting a plurality of signals from the MS, the signals having arrived from at least two of the plurality of WDAS remote units, wherein each of the plurality of the WDAS remote units comprises a variable gain amplifier, a user interface accessible via the Internet, and a rules engine, wherein the WDASC identifies each of the plurality of the WADS remote units based on a pseudo-random sequence (PN) of a decoded signal sent from each WDAS remote unit;
at the WDASC, selecting a first remote unit from the at least two WDAS remote units;
from the WDASC, wireless transmitting a first message to the first remote unit for shutting off a back-end reverse-link of the first remote unit;
wherein the selection of the first remote units is based at least in part on a measure of incoming signal strength from the MS at the first remote unit.

10. The method of claim 9, further comprising:
at the first remote unit, shutting off the back-end reverse-link of the first remote unit.

11. The method of claim 10, further comprising:
after shutting off the back-end reverse link of the first remote unit, receiving a second message at the first remote unit; and
in response to the second message, switching on the back-end reverse-link of the first remote unit.

12. The method of claim 11, wherein the second message is transmitted from the WDAS controller.

13. The method of claim 11, wherein the second message is transmitted from a second MS.

* * * * *